United States Patent [19]
Hood

[11] Patent Number: 5,152,570
[45] Date of Patent: Oct. 6, 1992

[54] RETRACTABLE CARGO RACK

[76] Inventor: Billy J. Hood, 9978 Lemon Ave., Fontana, Calif. 92335

[21] Appl. No.: 787,147

[22] Filed: Nov. 4, 1991

[51] Int. Cl.⁵ .............................................. B60P 3/00
[52] U.S. Cl. ....................................................... 296/3
[58] Field of Search ................. 296/3, 27, 26, 102; 224/42.42

[56] References Cited

U.S. PATENT DOCUMENTS

| | | | |
|---|---|---|---|
| 3,891,262 | 6/1975 | Brunel | 296/3 |
| 4,398,763 | 8/1983 | Louw | 296/3 |
| 4,509,787 | 4/1985 | Knaack et al. | 296/3 |
| 4,659,131 | 4/1987 | Flournoy, Jr. | 296/3 |
| 5,037,152 | 8/1991 | Hendricks | 296/3 |

*Primary Examiner*—Robert R. Song

[57] ABSTRACT

Side frames are mountable on a truck and are retractable into a compact package. Each frame comprises anchor members to which support posts are pivoted and which slidably support a longitudinally extending rail at their upper ends. A plurality of load supporting members are removably attached between the rails of the side frames.

3 Claims, 3 Drawing Sheets

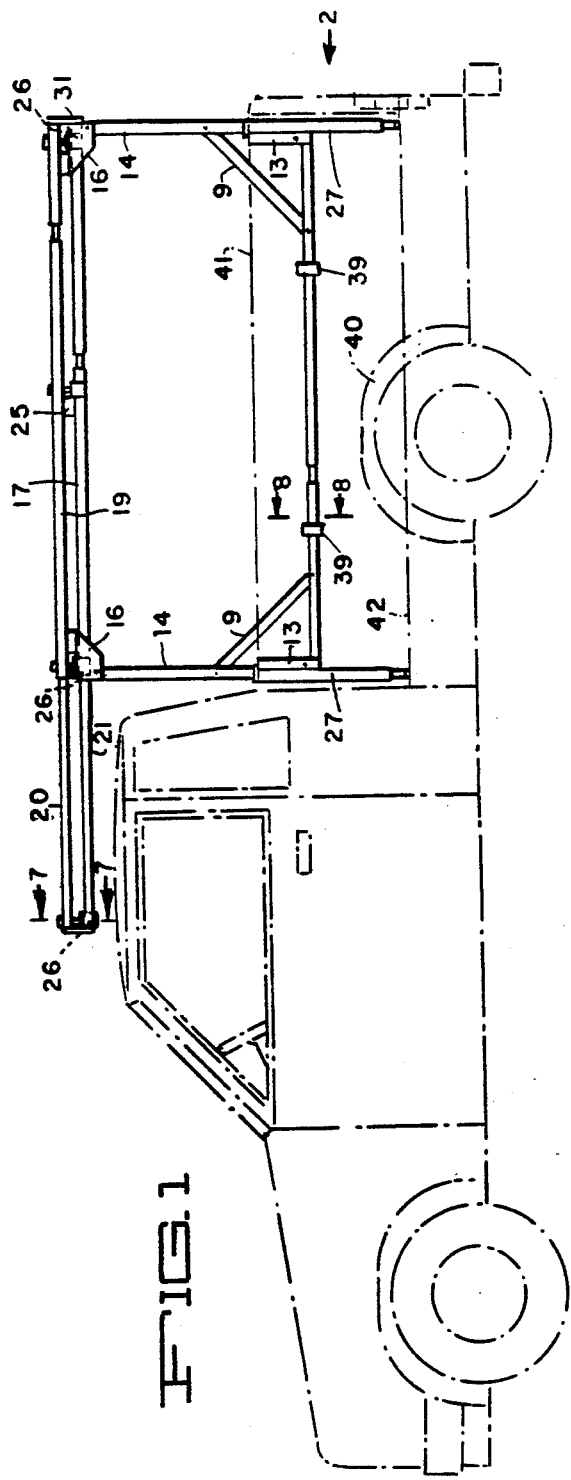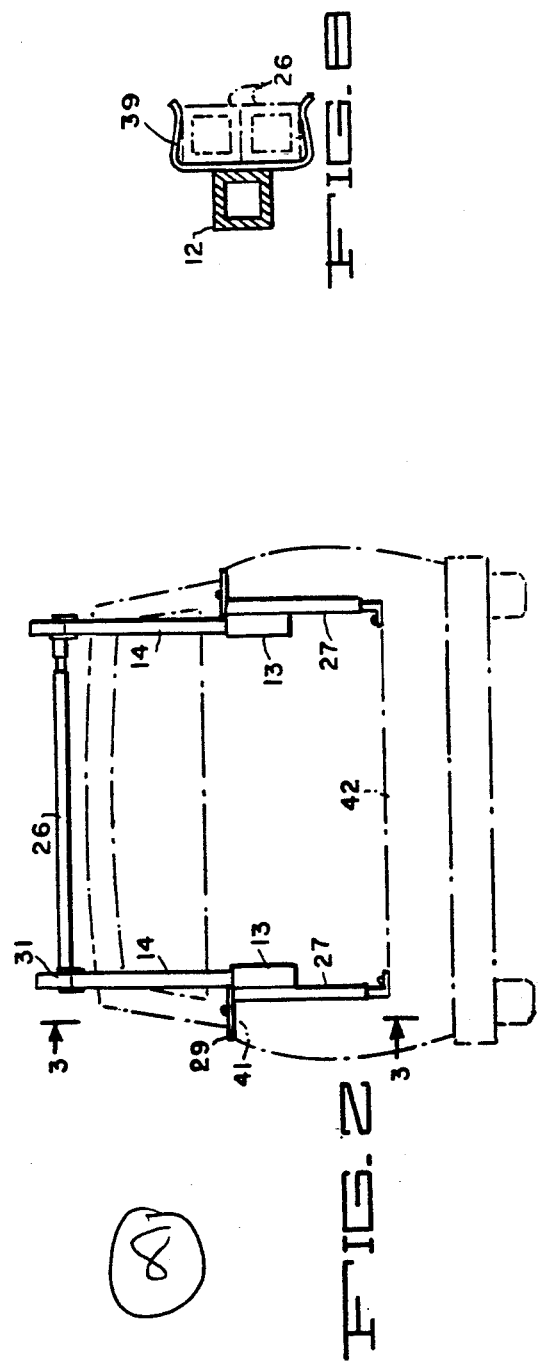

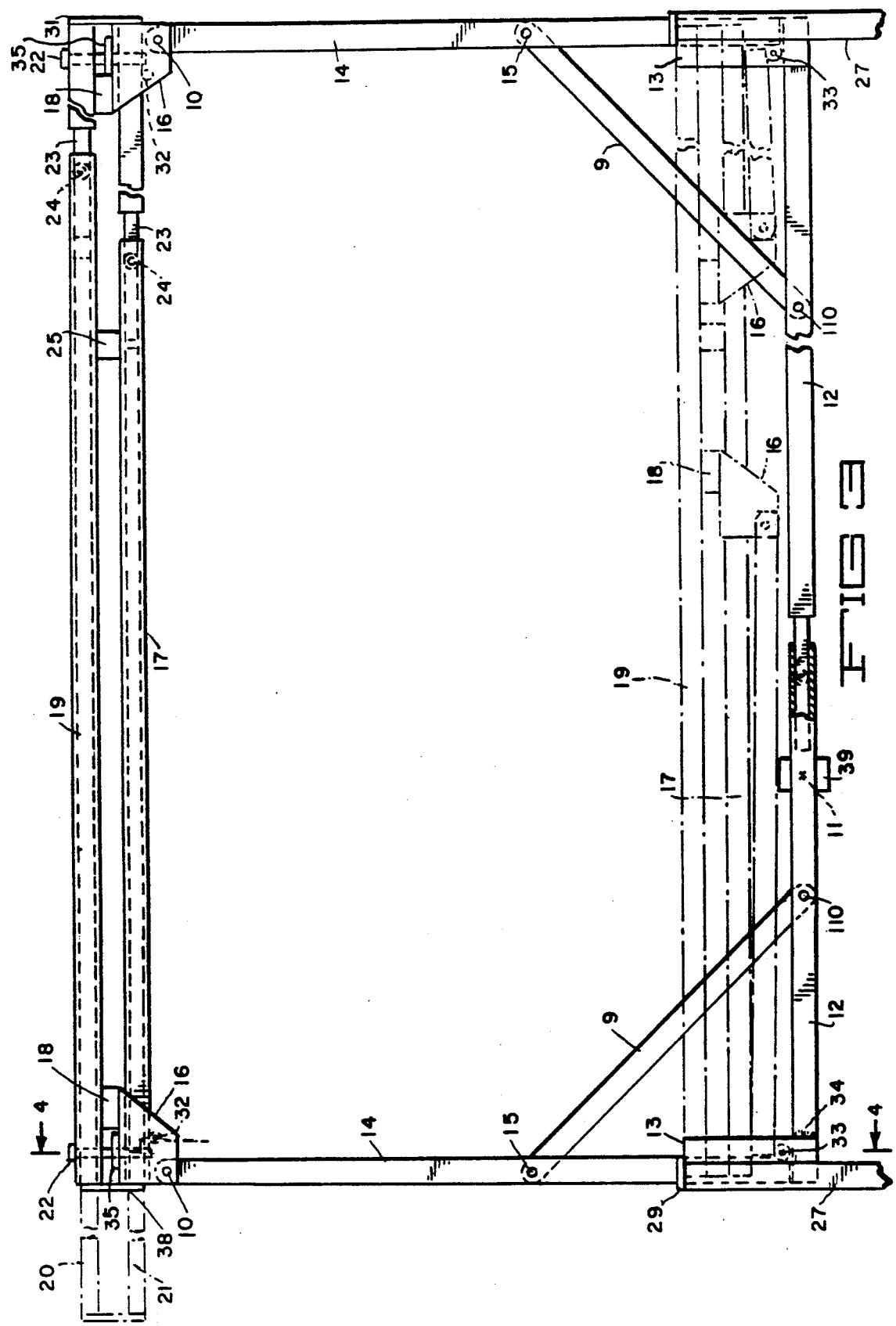

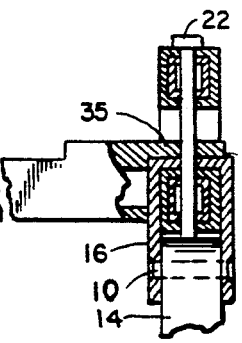
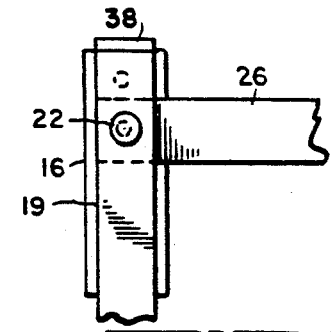
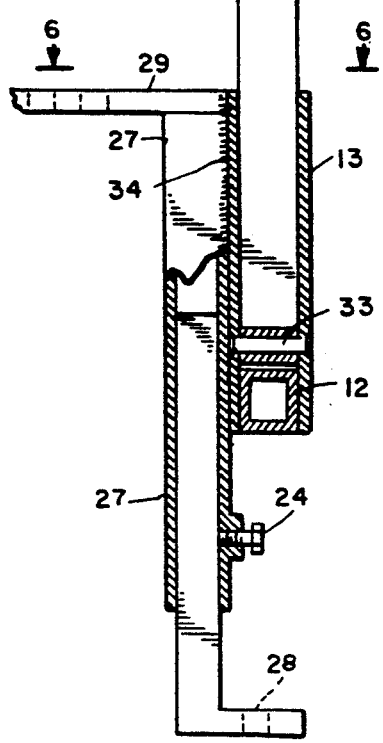
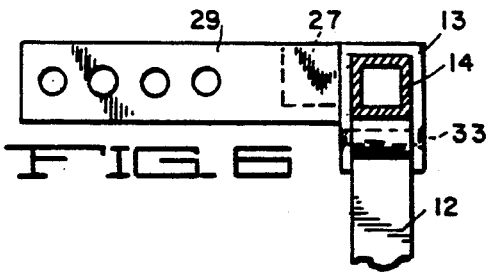
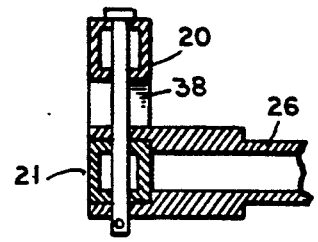
FIG.4
FIG.5
FIG.6
FIG.7

RETRACTABLE CARGO RACK

BACKGROUND

1. Field of Invention

This invention relates to a truck rack, specifically the elevated metal rack installed on pickup trucks, and has particular reference to a rack capable of being raised to an extended level and lowered to a stored position. Truck rack can be adjusted to fit various truck beds, both in width and length.

2. Description of Prior Art

Prior cargo racks create a drag and reduces gas mileage even while not in use yet bolted to the truck, due to their high profile and heavy gauge metal material causing extra weight Also, prior racks are custom fit and cannot be transferred to various types of pickups should the need arise for replacement of your truck.

In prior time, I invented a retractable rack. Disclosure #245816 from U.S. Department of Commerce Patent and Trademark Office is a Disclosure, dated Feb. 20, 1990, by Patent and Trademark Office, Mailroom #8.

Jiffy Truck Rack disclosure, prior art in said document #245816, can be noted on Page 1 and Item #1, refers to a top rail of truck rack for a grab bar to lift unit in upward and protracted position. #2 also item, Page 1, #2 being a fabricated top support box was found to be needless added expense and omitted, which cut material and labor costs. #6 of Page 3, #6 of Jiffy Truck Rack disclosure is also found to be unnecessary and omitted, cutting material and labor cost.

Prior pickup cargo racks are permanent, bulky, ugly and cumbersome fixtures and tend to limit what can be loaded in a pickup bed without the complete removal of the unit. Also requires two or more persons in order to prevent damage to the unit and the vehicle. Also, cargo racks require considerable storage space while detached, creating a negative attitude from viewers point.

OBJECTS AND ADVANTAGES OF INVENTION

1. To omit unsightly box bolted to top of side rails in Jiffy Truck Rack Disclosure.
2. Lift restricted access to sides of pickup.
3. Reduction in cost of labor and material.
4. Its universal fit capability reducing inventory for manufacturer and retailers.
5. Create easy access to use of invention at anytime.
6. The elimination of unsightly appearance by retracting unit when not in use.
7. Reduction of manpower to install or remove from the truck. Yet another object is to rid the limitation of oversized height in cargo by:
   a. Not having to remove the total rack.
   b. Creating easy breakdown and storage of unit in its original rest.

BRIEF DESCRIPTION OF THE DRAWINGS

The manner in which the above and other objects of the invention are accomplished will be readily understood on reference to the accompanying drawings when read in conjunction with the following specification wherein:

FIG. 1 is a side view of the rack mounted inside a truck being above the wheelwell, and with the over-the-cab structure extended.

FIG. 2 is an end view of rack and is taken in the direction of arrow 2 of FIG. 1.

FIG. 3 is an enlarged side view and is taken along the line 3—3 of FIG. 2.

FIG. 4 is a section elevation view taken along the line 4—4 of FIG. 3.

FIG. 5 is a fragmentary plan view taken along line 5—5 of FIG. 4.

FIG. 6 is a fragmentary sectional plan view taken along line 6—6 of FIG. 4.

FIG. 7 is a fragmentary section plan view taken along line 7—7 of FIG. 1.

FIG. 8 is a view of a storage clamp for crossbar in retracted position and is taken along line 8—8 of FIG. 1.

LIST OF REFERENCE NUMERALS

9. Diagonal swivel brace.
10. Pivot pin.
11. Inner race anchor weld.
12. Bottom telescopic race.
13. Rest support U channel.
14. Support post.
15. Removable pin.
16. Traverse race pivot housing.
17. Load bearing telescopic race.
18. Slide block support.
19. Top telescopic race.
20. Top race of cab-over extension.
21. Bottom race of cab-over extension.
22. Top lock removal pin.
23. Inner race.
24. Set screw.
25. Welded space block.
26. Fabricated telescopic crossbar.
27. Vertical telescopic anchor race.
28. Telescopic anchor bolt hole.
29. Adjustable anchor bolt hole tab.
30. ∅
31. Welded space tab.
32. Slide pin.
33. Pivot hinge.
34. Weld.
35. Horizontal crossbar attachment tab.
36. Hole.
37. ∅
38. Vertical top and bottom extension race attachment space tab.
39. Crossbar storage clamp.
40. Wheelwell.
41. Truck side rail.
42. Truck bed bottom.

DESCRIPTION

Referring to the drawings, the cargo rack comprises a pair of longitudinally spaced frames, each comprising a pair of longitudinally spaced vertical anchor members or races 27 (FIG. 1). A foot 28 (FIG. 4) on each member 27 is formed with a bolt hole for attachment to the bed 42 of the truck. A tab 29 on the member 27 is provided with bolt holes (FIG. 6) for attachments to the sides 41 of the truck. Also, a U-channel 13 is welded at 34 to the members 27 to receive a support post 14 pivoted thereto at 33. As seen in FIG. 6, the channel is U-shaped when viewed from the top.

A slide pin 32 is anchored to the pivot housing 16 which is pivoted at 10 to the top of each respective post 14 to slidably receive a tubular rail or race 17. The pin 16 slidably supports the rail 17 and the latter has a telescoping extension 23 secured therein by a set screw or the like 24. The housing 16 is U-shaped and is slidable along the rail 17 while being pivoted to the post to permit collapsing of the assembly.

A similar rail 19 is located above each rail 17 and is separated therefrom by a spacer block 25 attached to both rails.

A bottom rail 12 extends between the anchor members 27 of each frame and above the truck wheel wells 40. Diagonal braces 9 are removably connected by pins 45 and 110 to the post 14 to hold the post in its upright position. By removing the braces 9, the post 14 can be folded down as shown by the dot-dash lines in FIG. 3, causing the housings 16 to slide along the rails 17. Block 18 secured on the pivot housing slides below rail 19 to help keep the rail 19 spaced above the rail 17. A tab 38 is secured between the outer ends of the rails 20 and 21 so that they will slide as a unit.

Cab-over extension rails 20 and 21 are slidably mounted in the rails 17 and 19 respectively and can be slid out as shown in FIG. 1 to extend over the truck cab. A tab is secured between the outer ends of the rails 20 and 21 so that they will slide as a unit.

Crossbars 26 having telescoping extensions 123 (FIG. 4) are extended between the frames as seen in FIGS. 2, 4, and 5. Each has a foot or tab 35 which fits over a slide block 16 and rests on top of rail 17 and is manually secured thereto by a pin 22 which also locates the rails 20 and 21 and locks them in place. Set screw 241 locks the crossbar 26 in different extended positions depending on the width of the truck bed.

When the rack is to be collapsed into its dot-dash line position shown in FIG. 3, the pins 22 are moved, enabling the crossbars 26 to be removed and stored by fitting the same between spring fingers 39 (FIG. 8) of clips suitably attached to bottom rails 12 of the side frames.

OPERATION

To erect the rack from its collapsed position shown the dot-dash lines of FIG. 3, the rails 17 and 19 of each side frames are raised, causing the post 14 to swing toward their vertical position and causing the pivot housing 16 to slide along the rail 17 thus completing its course in its extended position, allowing the diagonal brace 9 (FIG. 3) to be secured by inserting the removable pin 15, locking the side frames in a secure position. The load supporting crossbars (26) are then placed in position with their tab 35 fitting over the pivot housing 16 and over the extension rails 20 and 21 (FIG. 3) which must be extended from its telescoped position and pins 22 are then passed through aligned holes 36 in the members as seen in FIG. 4 to lock the members in an erected position.

To collapse the rack, the above procedure is merely reversed.

SUMMARY

Accordingly, the reader will see that retractable of this invention can be easily erected and retracted by the consumer. In addition, when the invention is in the retracted and stored position, the looks of the vehicle vastly improves. Furthermore, the invention has the additional advantages that prior racks were unable to provide:

a. It permits the retraction of the unit at a moments notice.
b. It permits the use of only one person to activate in the upward and/or downward position.
c. It permits the consumer to use in various truck beds, making it universal for foreign and domestic trucks.
d. It permits easy storage without removing it totally.
e. It permits easy loading of over-sized height cargo when it is retracted.
f. It eliminates obstruction without removing rack from truck.

I claim:

1. A retractable load carrier for a truck or the like comprising
   (a) a pair of spaced side frames, each of said frames comprising
   (b) a pair of fore and aft anchor members adapted to be secured to a respective lateral side of said truck,
   (c) a pair of support posts,
   (d) a longitudinally extending rail,
   (e) means pivotally connecting said posts at the lower ends thereof to respective ones of said members,
   (f) means forming pivoted slide connections between the upper ends of said posts and said rail, and
   (g) releasable means for maintaining said posts in upright positions;
   (h) a plurality of transversely extending load supporting members, and
   (i) means for removably attaching said supporting members between said rails of said frames.

2. A load carrier as defined in claim 1 wherein said rail of each of said frames comprises a pair of telescoping rail posts adapted to fit truck beds of different lengths.

3. A load carrier as defined in claim 1 wherein each of said load supporting members comprises a pair of telescoping posts adapted to fit truck beds of different widths.

* * * * *